UNITED STATES PATENT OFFICE.

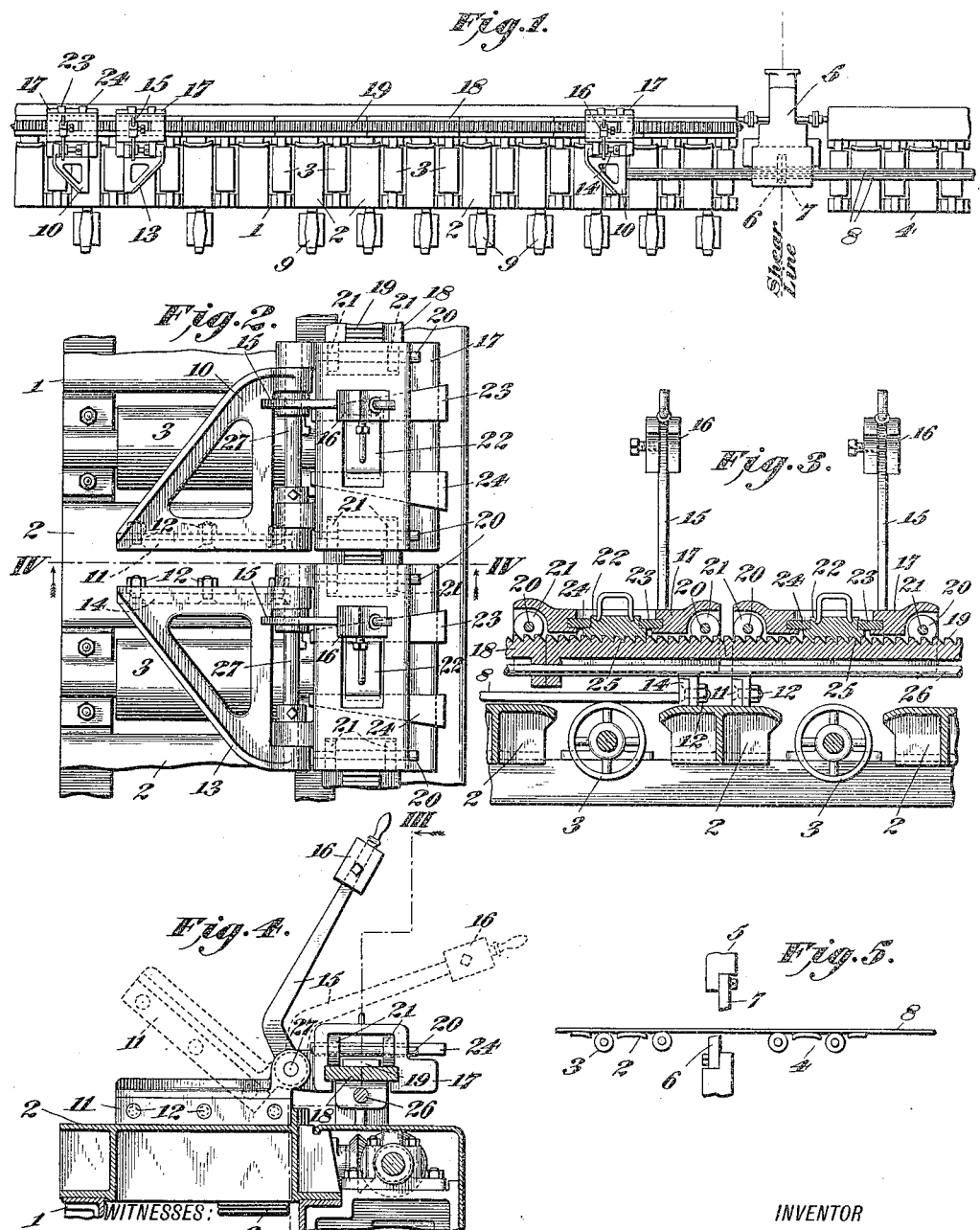

WARREN WORTHINGTON, OF WESTMONT BOROUGH, PENNSYLVANIA.

SHEAR-GAGE.

1,150,921.      Specification of Letters Patent.      Patented Aug. 24, 1915.

Application filed March 22, 1915. Serial No. 16,005.

*To all whom it may concern:*

Be it known that I, WARREN WORTHINGTON, a citizen of the United States, and a resident of the borough of Westmont, county of Cambria, and State of Pennsylvania, (whose post-office address is Johnstown, Pennsylvania,) have invented certain new and useful Improvements in Shear-Gages; and I do hereby declare the following to be a full, clear, and exact description of the invention, such as will enable others skilled in the art to which it appertains to make and use the same.

My invention in general relates to what is known as a gage or stop which may be arranged at different and predetermined distances from a shear, punch or other tool to accurately gage the distance from the end of a bar, bars or other material, to the place at which it or they will be cut off, punched or otherwise operated upon.

My gage is provided with a number of stops so arranged that the operation of shearing or punching may be done at different and predetermined lengths from the end of a bar or of a number of bars or other material, without in any way delaying the operations of any lengths and without the necessity of changing the location of any of the gages or stops during the operation.

My gage is also firmly and rigidly constructed so that the predetermined distances from the shear or other tool to the ends of the bars are, and will remain absolutely accurate and the portions of the construction which determine this are made sufficiently strong so that the bars or other material may strike the gage stop forcibly without affecting the gage lengths.

My apparatus, in general, consists of a long toothed rack provided with a number of gates adapted to be very firmly located at any point or points of its length and securely held there, and each of the gates is also provided with finer adjusting means whereby the length from the stop plate thereon to the shear or tool can be regulated to any degree of nicety desired.

My gage is also so arranged that bars of different lengths may be operated upon approximately at the same time without any necessity for changing the location of any of the gates during the operation, this being accomplished by constructing the gates so that their stop surfaces can be close together within reasonable limits whereby a bar or bars of different lengths can be sheared or punched, or otherwise operated upon, at predetermined distances from their ends without any delay nor necessity for shifting any of the gates, one set of bars being controlled by one gate and the others by other gates, set at any distances desired from the shear or other tool.

Although I have illustrated and described my invention in connection with a shear table, I wish it understood that it is applicable to punches, presses or other tools, as will be readily understood.

Having thus given a general description of my invention, I will now, in order to make the matter more clear, refer to the annexed sheet of drawings which form part of this specification and in which like numbers and characters refer to like parts.

Figure 1 is a top plan view of a shear table showing three gates mounted thereon; Fig. 2 is a top plan view of a portion of the shear table with two gates mounted thereon, drawn on a larger scale to more clearly illustrate the invention; Fig. 3 is a vertical longitudinal sectional elevation taken on the line III—III of Fig. 4; Fig. 4 is a vertical transverse sectional elevation taken on the line IV—IV of Fig. 2; and Fig. 5 is a diagrammatic view of a portion of a shear table and shear showing the manner of cutting the bars.

Referring now to the characters of reference on the drawings:—1 indicates the delivery table in general which consists of a frame, an apron plate 2, rollers 3, which are preferably driven by gearing as shown, in order to transfer bars or other material longitudinally on the said table; 4 is a similar table which delivers material to the shear 5, which shear, however, may be replaced by a punch, press or other tool as desired. The lower shear blade is indicated as 6, the upper shear blade as 7, between which the bars 8 may be cut to any lengths predetermined by the location of the gates of the gage.

9 indicate yokes or short troughs into which the bars or other material are delivered after having been cut, a number of bars being assembled in said yokes preparatory to lifting them together by means of a crane, or otherwise, to their next destination.

One of the gates is indicated generally as 10 which is provided with a stop plate 11 secured thereto by countersunk bolts 12, as shown, in order that the surface against which the bars abut shall be smooth. This stop plate 11 is arranged at right angles to the line of travel of said bars so that all will be cut to the length desired.

13 represents a companion gate which is provided with a stop plate 14 similarly secured by the countersunk bolts 12, this stop plate 14, however, being on the opposite side of the gate as compared with the first one, so that it also faces the end of the bars or other material adapted to contact with it, this plate also being parallel to the shear blades. These stop plates 11 and 14 overhang the rollers 3, as illustrated, and the gates on which they are secured are pivotally mounted on separate shafts 27 and firmly secured to said shafts are the levers 15 provided with the counterweights 16. By means of these levers 15, the operator can move either of the gates into position so that stop plates 11 or 14 are directly above and parallel to the rollers 3, or, when desired by pulling either lever downward, any of the gates can be lifted as indicated in dotted lines in Fig. 4, so that it is inoperative with respect to bars on the rollers, while the counterweight so holds it. Carriages for the gates 10 and 13 are indicated as 17, which carriages are provided with axle shafts 20 and wheels 21, whereby they can be easily moved backward or forward longitudinally of the rack bar 18. Either of the carriages 17 can be located at any predetermined position on the rack bar 18 at any distance desired from the shear or other tool, whereupon a toothed dog 22 is inserted in the opening in said carriage, the teeth 25 of which engage with the corresponding teeth 19 of the rack bar. In addition to this, wedges or keys 23 and 24 are provided, which fit into suitably formed openings in the carriages and abut the ends of the dog 22. By driving one of these wedges inwardly and the other outwardly or vice versa, the carriage 17 may be adjusted to any degree of nicety on the rack bar so that the distance from the face of the stop plates 11 or 14 can be at any predetermined distance from the cutting edge of the shear 5, punch, press or other tool. These wedges allow for a finer adjustment than that which could be had by means of the coarse teeth 19 and 25 of the rack bar and dog. The rack bar 18 is preferably made of heavy sections of cast iron or steel bolted together for convenience of construction, but, in order to insure that this rack bar shall remain of constant length, it is held firmly together by the through bolt or rod of large diameter 26, which runs the full length of the rack bar and is secured by nuts or keys at the outer ends of the end sections thereof and is thereby adapted to hold the sections of the rack bar firmly together. This bolt, therefore, will receive the shock of the bars or other material contacting forcibly with the stop plates 11 or 14 and insures that the gage will, at all times, accurately determine the length from the shear or other tool to the said stop plates.

In cutting bars of steel or other material which come from a rolling mill, or otherwise, in large numbers and in great frequency, it is desirable when filling orders, to cut bars of different lengths without stopping the delivery of the same. This, I accomplish by setting one of the gates, such as 13, so that its stop plate 14 is a shorter distance from the shear or other tool, and by setting the other gate 10 so that its stop plate 11 is at a greater distance from said shear, and other gates with their stop plates may be set at other distances from said shear. For example: four steel tire bars are to be cut, two of which are of certain length, such as eleven feet four inches to fit the front wheel of a wagon or buggy and other two longer tire bars of about twelve feet four inches are to be cut from the same bars to fit the hind wheels of a buggy. I, therefore, set the first gate 13 with its stop plate 14 at a distance of eleven feet four inches from the shear and set the other gate 10 so that its stop plate 11 will be twelve feet four inches from the shear. As a bar or group of bars comes through the shear, their ends are stopped against the first gate which is down, whereupon the shear is operated and cuts them to a length of eleven feet four inches, whereupon the gate 13 is raised by means of the lever 15 and the next set of bars will then contact with the stop plate 11 of the gate 10 which is down and will be cut to the next length of twelve feet four inches, all without any appreciable stoppage of the movement of the bars. Other gages may be set at other lengths to cut long bars into any predetermined lengths.

It should be noted that the shafts 14 are quite long and the bearings of the gates 10 and 13 are far apart which makes a rigid construction so that the gates are held so firmly that they are held in the exact position desired and maintain the stop plates 11 and 14 accurately parallel and equidistant at all points from the shear or other tool, which is much to be desired in constructions of this character. It should also be noted that the construction and arrangement of the wedges 25 and 24 makes this part of the apparatus very firm and solid and when once set correctly, the gates will so remain without further attention. In addition to this the bolt 26 which clamps the sections of the rack bar firmly together is so heavy and strong that the rack gage always maintains its length without variation. When a lot of bars, say one hundred or two hundred feet long, or more, come from a rolling mill, it may so happen that they cannot be cut economically into pieces of any one length, and, on account of my different gates, they can be cut into different lengths as ordered or desired, so as to use the material economically without waste or crop ends.

Although I have shown and described my improvements in considerable detail, I do not wish to be limited to the exact and specific details shown and described, but may use such substitutions, modifications or equivalents thereof, as are embraced within the scope of my invention, or as pointed out in the claims.

Having thus described my invention, what I claim and desire to secure by Letters Patent is:—

1. A gage provided with a plurality of gates rotatably mounted on carriages, each of which is adapted to be arranged at a predetermined distance from a shear or other tool.

2. A gage comprising a plurality of gates rotatably mounted on carriages, means for securing the same rigidly at predetermined distances from a shear or other tool, each of said gates being adapted to be placed into or out of operative engagement with bars issuing from said tool.

3. A shear gage comprising a plurality of gates rotatably mounted on carriages and overhanging a delivery table and arranged to be fixed at different predetermined distances from a shear or other tool, said gates being independently mounted, whereby one or more of them can be put into operative or inoperative positions.

4. A gage comprising a toothed rack bar, a gate adapted to be secured to said rack bar at any predetermined position, said gate being provided with a carriage having an opening therein, a toothed dog adapted to loosely fit in said opening and means coöperating with said dog for slightly adjusting said gate longitudinally on said rack bar.

5. A gage comprising a toothed rack bar, a carriage mounted thereon and adapted to be used in any position along the same, an opening in said carriage, a toothed dog adapted to loosely fit therein, wedges at each end of said dog adapted to contact with same and with the adjacent surfaces of said carriage, whereby the position of the carriage may be adjusted and maintained, a hinged gate mounted on said carriage and adapted to be lowered or raised into operative or inoperative position.

6. In a gage, a gate on a carriage, said carriage having a locking dog adapted to loosely fit an opening therein, a toothed rack bar composed of a plurality of sections, a through bolt extending from end to end of said rack bar and provided with means to firmly clamp said bar sections together, whereby its length is accurately maintained.

7. A gage comprising a toothed rack bar, a carriage mounted over the same, a dog provided with teeth corresponding to those of the rack bar, the ends of said dog being adjacent to the surfaces of the carriage, a pair of wedges interposed between the ends of said dog and said surfaces, whereby the location of the carriage may be finely adjusted, a gate mounted on said carriage and provided with a stop plate.

8. A gage comprising a toothed rack bar, a carriage mounted over the same, a dog provided with teeth corresponding to those of the rack bar, the ends of said dog being adjacent to the surface of the carriage, a pair of wedges interposed between the ends of said dog and said surfaces, whereby the location of the carriage may be finely adjusted, a rotatable gate mounted on said carriage and adapted to be fixed at predetermined locations on said rack bar and rotated into or out of operative position.

In testimony whereof I hereto affix my signature in the presence of two witnesses.

WARREN WORTHINGTON.

Witnesses:
E. H. CLARKSON,
OLIVER B. HICKOX.

Copies of this patent may be obtained for five cents each, by addressing the " Commissioner of Patents, Washington, D. C."